United States Patent
Li et al.

(10) Patent No.: US 8,497,663 B2
(45) Date of Patent: Jul. 30, 2013

(54) CHARGING DEVICE

(75) Inventors: Cheng-Tao Li, Hsinchu (TW);
Yu-Ching Lin, Hsinchu (TW)

(73) Assignee: UPI Semiconductor Corporation, Hsinchu (TW)

( * ) Notice: Subject to any disclaimer, the term of this patent is extended or adjusted under 35 U.S.C. 154(b) by 537 days.

(21) Appl. No.: 12/768,844

(22) Filed: Apr. 28, 2010

(65) Prior Publication Data
US 2011/0101926 A1    May 5, 2011

(30) Foreign Application Priority Data

Nov. 4, 2009  (TW) ................................. 98137360 A

(51) Int. Cl.
*H02J 7/00* (2006.01)
(52) U.S. Cl.
USPC .......................................... 320/166; 320/167
(58) Field of Classification Search
USPC ................................................ 320/166–167
See application file for complete search history.

(56) References Cited

U.S. PATENT DOCUMENTS

| | | | | |
|---|---|---|---|---|
| 2004/0130299 | A1* | 7/2004 | Pietkiewicz et al. | 320/166 |
| 2005/0093518 | A1* | 5/2005 | Chu et al. | 320/166 |
| 2005/0134235 | A1* | 6/2005 | Pai et al. | 320/166 |
| 2005/0140340 | A1* | 6/2005 | Pai et al. | 320/166 |
| 2005/0237032 | A1* | 10/2005 | Tan et al. | 320/166 |
| 2010/0109613 | A1* | 5/2010 | Chuang et al. | 320/166 |

\* cited by examiner

*Primary Examiner* — Samuel Berhanu
(74) *Attorney, Agent, or Firm* — McClure, Qualey & Rodack, LLP

(57) ABSTRACT

A charging device for providing an output voltage to charge a flash capacitor is provided. A transformer includes a primary winding and a secondary winding. The transformer generates a primary voltage according to an input voltage and generates a secondary voltage according to the primary voltage. A diode coupled between the secondary winding of the transformer and the flash capacitor provides the output voltage according to the secondary voltage. A current detector detects a current flowing through the primary winding of the transformer and generates a detection signal. A determining circuit generates a determining signal according to the primary voltage, the secondary voltage and a reference voltage. A control circuit switches a switch coupled between the primary winding of the transformer and a ground according to the detection signal and the determining signal, so as to control the transformer to charge the flash capacitor.

17 Claims, 5 Drawing Sheets

US 8,497,663 B2

CHARGING DEVICE

CROSS REFERENCE TO RELATED APPLICATIONS

This application claims priority of Taiwan Patent Application No. 098137360, filed on Nov. 4, 2009, the entirety of which is incorporated by reference herein.

BACKGROUND OF THE INVENTION

1. Field of the Invention

The invention relates to a charging device, and more particularly to a charging device for a flash capacitor.

2. Description of the Related Art

In general, a camera comprises a flash module, a flash capacitor and a charging device for charging the flash capacitor. The flash capacitor will store energy in advance, so as to provide the stored energy to the flash capacitor to generate a flash when a user uses a flash function to take a picture.

FIG. 1 shows a conventional capacitor charging circuit 100 disclosed in U.S. Pat. No. 7,292,005. The capacitor charging circuit 100 comprises a control circuit 110, a measuring circuit 120 and a power delivery circuit 130, wherein the power delivery circuit 130 is coupled to an output capacitor 150 via an output diode 140. In the power delivery circuit 130, an OR gate 132 receives a first signal from a determining circuit 131 and a second signal from the control circuit 100, and generates a first control signal to a latch 133 to turn on a transistor 134. In addition, the latch 133 turns the transistor 134 off according to a second control signal provided by a determining circuit 135.

In FIG. 1, an input source 160 provides energy to a transformer 170 when the transistor 134 is turned on. Next, the transformer 170 transforms the energy stored at a primary winding to a secondary winding. Furthermore, when the secondary voltage of the transformer 170 is increased, the primary voltage of the transformer 170 is also increased. By switching the transistor 134 continuously, the capacitor charging circuit 100 charges the output capacitor 150 to a desired voltage.

FIG. 2A and FIG. 2B separately show operation of the transistor 134 at the $n^{th}$ switch state and the $m^{th}$ switch state (m>n). The signal $S_C$ represents the switch signal provide by the latch 133, which is used to control the transistor 134 to turn on or off, and the signal $V_{SW}$ represents the primary voltage of the transformer 170. When the secondary voltage of the transformer 170 is output to the output capacitor 150 (i.e. the output capacitor 150 is charged), the secondary voltage is decreased, and then the primary voltage $V_{SW}$ of the transformer 170 is also decreased. As shown in FIG. 2A and FIG. 2B, when the primary voltage $V_{SW}$ received by the comparator 136 is smaller than a reference voltage $V_{REF}$) the latch 133 turns the transistor 134 on according to the first signal provide by the determining circuit 131. For example, in FIG. 2A, the transistor 134 is turned on when the primary voltage $V_{SW}$ is decreased from a voltage level $V_{L1}$ to a voltage level of the reference voltage $V_{REF}$. In FIG. 2B, the transistor 134 is also turned on when the primary voltage $V_{SW}$ is decreased from a voltage level $V_{L2}$ to the voltage level of the reference voltage $V_{REF}$, wherein $V_{L2}>V_{L1}$. When the primary voltage $V_{SW}$, which is varied, following the secondary voltage of the transformer 170 is gradually increased, it takes an excess amount of time to decrease under the reference voltage $V_{REF}$ since the reference voltage $V_{REF}$ is fixed. For example, a response time period t2 of FIG. 2B is larger than a response time period t1 of FIG. 2A. Thus, charging time of the output capacitor 150 is increased and charging efficiency is decreased.

Therefore, a charging device which is able to speedily charge a flash capacitor is desired.

BRIEF SUMMARY OF THE INVENTION

Charging devices for providing an output voltage to charge a flash capacitor are provided. An embodiment of a charging device for providing an output voltage to charge a flash capacitor comprises a transformer comprising a primary winding and a secondary winding, a diode coupled between the secondary winding of the transformer and the flash capacitor, a current detector, a switch coupled between the primary winding of the transformer and a ground, a determining circuit and a control circuit. The transformer generates a primary voltage at the primary winding according to an input voltage and generates a secondary voltage at the secondary winding according to the primary voltage. The diode provides the output voltage according to the secondary voltage. The current detector detects a current flowing through the primary winding of the transformer to generate a detection signal. The determining circuit generates a determining signal according to the primary voltage, the secondary voltage and a reference voltage. The control circuit switches the switch according to the detection signal and the determining signal, so as to control the transformer to charge the flash capacitor.

Another embodiment of a charging device for providing an output voltage to charge a flash capacitor is also provided. The charging device comprises a transformer comprising a primary winding and a secondary winding, a diode coupled between the secondary winding of the transformer and the flash capacitor, a switch coupled between the primary winding of the transformer and a ground, and a control circuit. The transformer generates a primary voltage at the primary winding according to an input voltage and generates a secondary voltage at the secondary winding according to the primary voltage. The diode provides the output voltage according to the secondary voltage. The control circuit controls the switch to turn on or off. The control circuit controls the switch to turn on when the primary voltage has begun to decrease, such that the transformer generates the primary voltage according to the input voltage. The control circuit controls the switch to turn off when a current flowing through the primary winding of the transformer is larger than or equal to a specific current, such that the transformer provides the secondary voltage to the diode according to the primary voltage, so as to charge the flash capacitor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
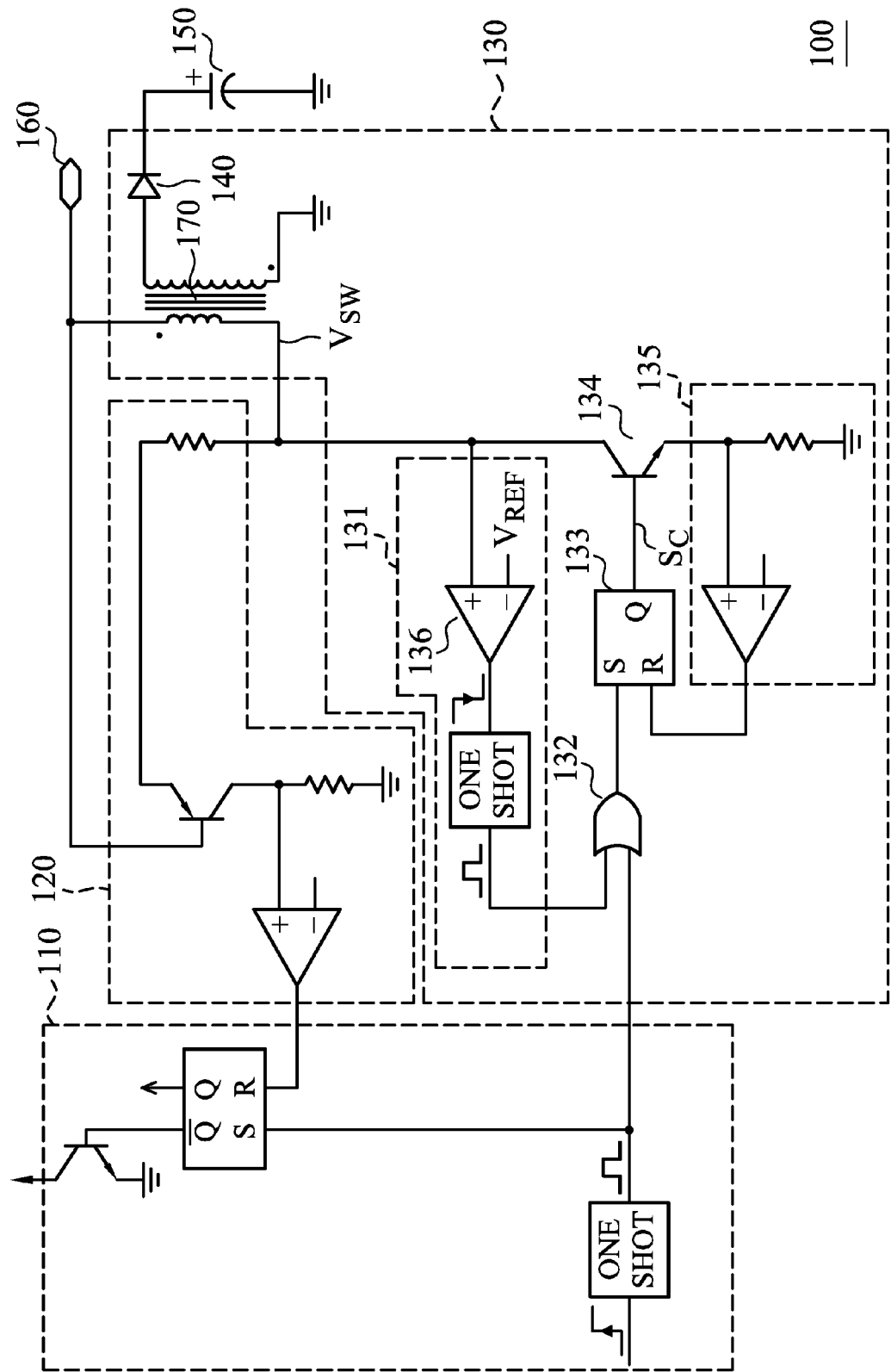
FIG. 1 shows a conventional capacitor charging circuit.
Figure 2B:
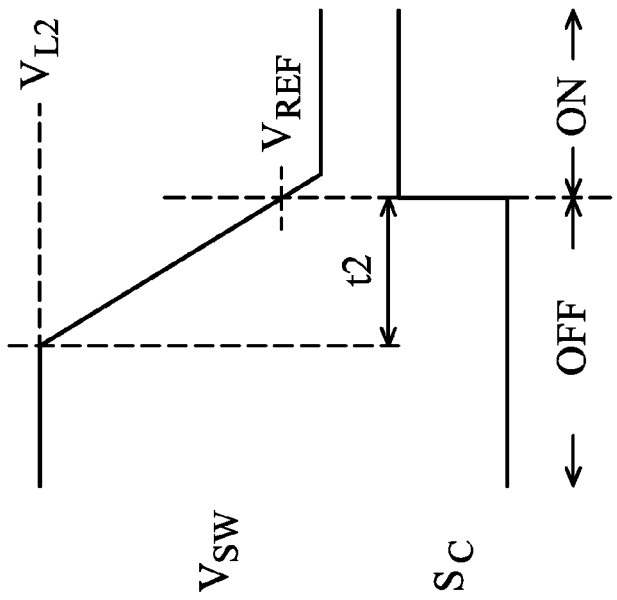
FIGS. 2A and 2B show the waveform diagrams illustrating a primary voltage and a switch state of the transistor in FIG. 1.
Figure 2A:
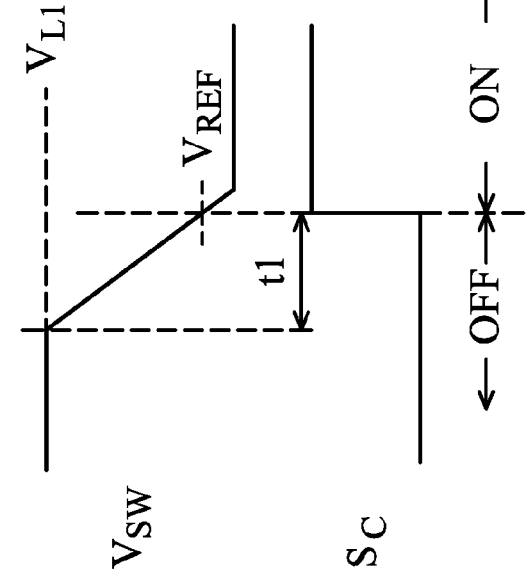
Figure 3:
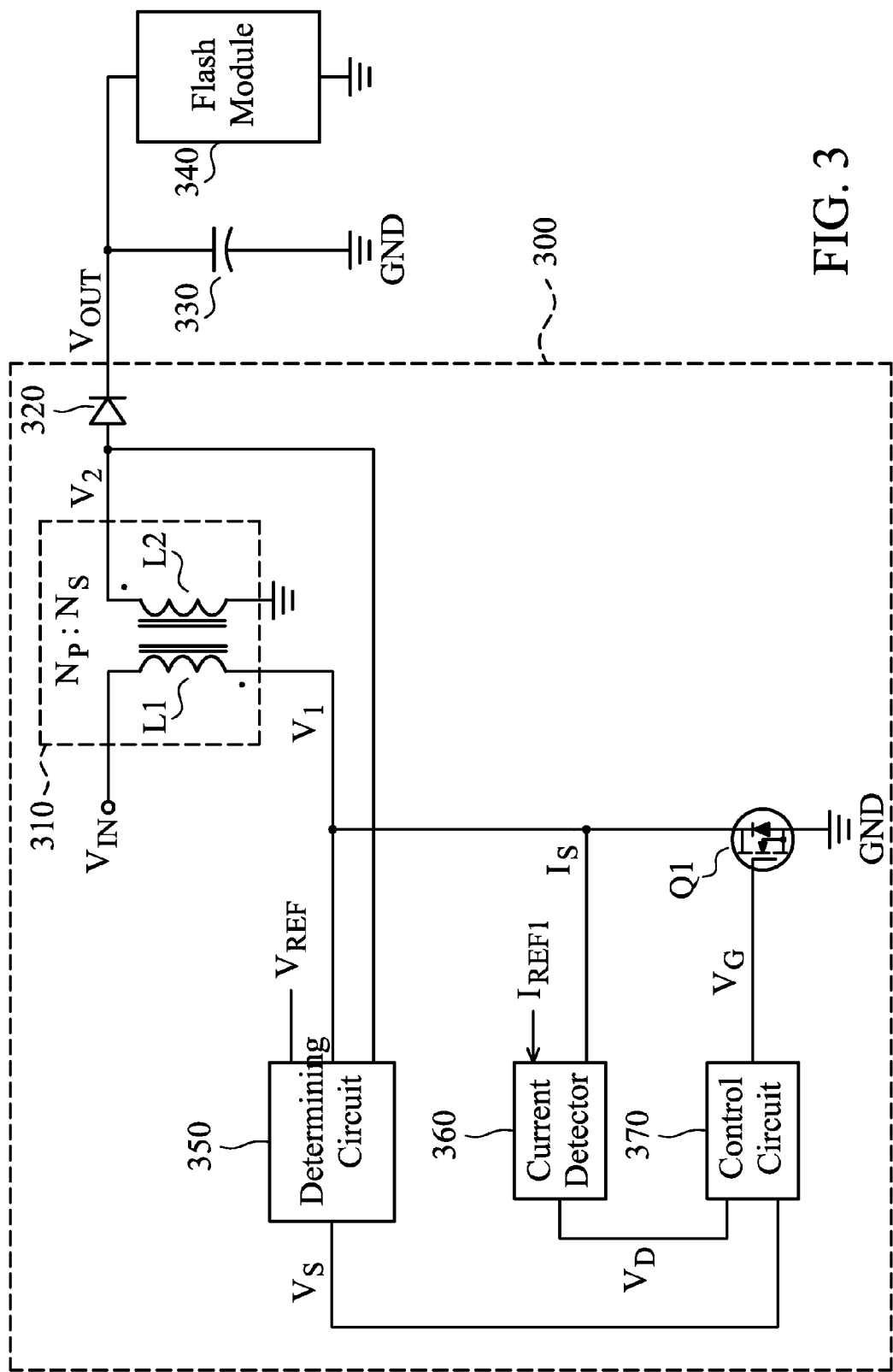
FIG. 3 shows a charging device according to an embodiment of the invention.

FIG. 3 shows a charging device 300 according to an embodiment of the invention. The charging device 300 comprises a transformer 310, a diode 320, a determining circuit 350, a current detector 360, a control circuit 370 and a transistor Q1. The transformer 310 comprises a primary winding L1 and a secondary winding L2, wherein a winding ratio of the primary winding L1 and the secondary winding L2 is $N_P:N_S$. The transformer 310 generates a primary voltage $V_1$ at the primary winding L1 according to an input voltage $V_{IN}$, and generates a secondary voltage $V_2$ at the secondary winding L2 according to the primary voltage $V_1$. The determining circuit 350 is coupled to the primary winding L1 and the secondary winding L2, and the determining circuit 350 generates a determining signal $V_S$ according to the primary voltage $V_1$, the secondary voltage $V_2$ and a reference voltage $V_{REF}$. The current detector 360 is coupled to the primary winding L1, wherein the current detector 360 generates a detection signal $V_D$ by detecting a current flowing through the primary winding L1 and provides the detection signal $V_D$ to the control circuit 370. Next, the control circuit 370 generates a switch signal $V_G$ according to the determining signal $V_S$ and the detection signal $V_D$, so as to control the transistor Q1 to turn on or off. In the embodiment, the transistor Q1 is coupled between the primary winding L1 and a ground GND, which functions as a switch.

As shown in FIG. 3, when the transistor Q1 is turned on, the transformer 310 charges the primary winding L1 according to the input voltage $V_{IN}$ since the primary voltage $V_1$ is small (e.g. approaches to 0V). In addition, when the transistor Q1 is turned off, the transformer 310 generates the secondary voltage $V_2$ to the diode 320 according to the primary voltage $V_1$. The diode 320 is coupled between the secondary winding L2 and a flash capacitor 330, which has an anode coupled to the secondary winding L2 and a cathode coupled to the flash capacitor 330. The transformer 310 provides the output voltage $Y_{OUT}$ to the flash capacitor 330 via the diode 320, so as to charge the flash capacitor 330. Therefore, by switching the transistor Q1 continuously, the charging device 300 charges the flash capacitor 330 to a predetermined voltage $V_{max}$, so as to provide energy to a flash module 340 to generate a flash. Meanwhile, the diode 320 prevents an inverse current from the flash capacitor 330 to flow back to the transformer 310.

When the transistor Q1 is turned on, the current detector 360 provides the detection signal $V_D$ to the control circuit 370 to indicate whether a current $I_S$ corresponding to the current flowing through the primary winding L1 is larger than or equal to a first reference current $I_{REF1}$. Thus, the control circuit 370 controls the transistor Q1 to turn off when the detection signal $V_D$ indicates that the current $I_S$ is larger than or equal to a first reference current $I_{REF1}$. Next, the transformer 310 transforms the primary voltage $V_1$ at the primary winding L1 to the secondary winding L2, so as to generate the secondary voltage $V_2$ to charge the flash capacitor 330. Next, the determining circuit 350 provides the determining signal $V_S$, indicating whether the primary voltage $V_1$ has begun to decrease, to the control circuit 370 according to the primary voltage $V_1$, the secondary voltage $V_2$ and the reference voltage $V_{REF}$. When the determining signal $V_S$ indicates that the primary voltage $V_1$ has begun to decrease due to the secondary voltage $V_2$ decreasing, the transistor Q1 is turned on by the control circuit 370 according to the determining signal $V_S$. Thus, the transformer 310 generates the primary voltage $V_1$ according to the input voltage $V_{IN}$.

Figure 4:
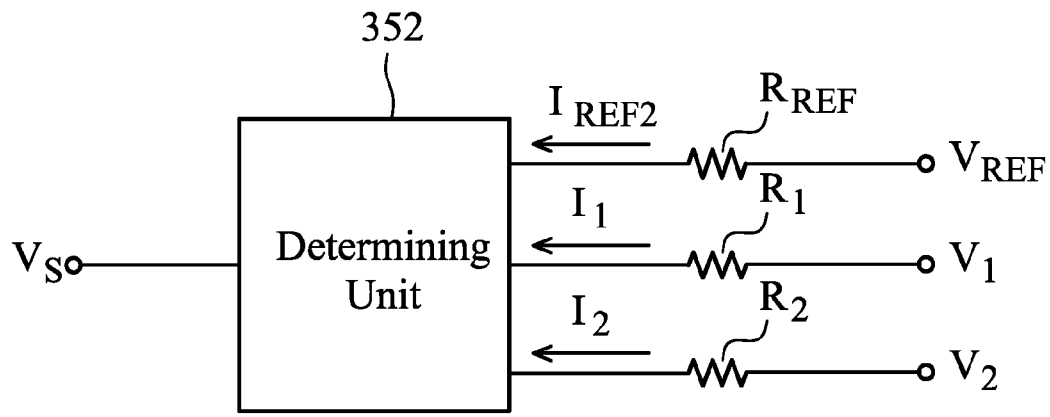
FIG. 4 shows a determining circuit according to an embodiment of the invention.
Figure 5:
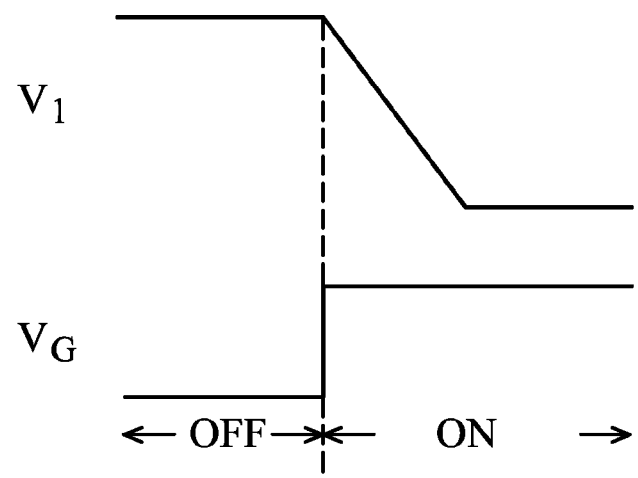
FIG. 5 shows a waveform diagram illustrating a primary voltage and a switch state of the transistor according to an embodiment of the invention.

FIG. 4 shows a determining circuit 350 according to an embodiment of the invention. The determining circuit 350 comprises a determining unit 352 and three resistors $R_{REF}$, $R_1$ and $R_2$. Referring to FIG. 3 and FIG. 4, the resistor $R_{REF}$ is coupled between the determining unit 352 and the reference voltage $V_{REF}$, which provides a second reference current $I_{REF2}$ to the determining unit 352 according to the reference voltage $V_{REF}$. The resistor $R_1$ is coupled between the determining unit 352 and the primary winding L1, which provides a first current $I_1$ corresponding to the primary voltage $V_1$ to the determining unit 352. The resistor $R_2$ is coupled between the determining unit 352 and the secondary winding L2, which provides a second current $I_2$, corresponding to the secondary voltage $V_2$, to the determining unit 352. The determining unit 352 generates the determining signal $V_S$ to the control circuit 370 according to the received second reference current $I_{REF2}$, the received first current $I_1$ and the received second current $I_2$. In one embodiment, when the first current $I_1$ is smaller than or equal to the sum of the second reference current $I_{REF2}$ and the second current $I_2$ (i.e. $I_1 \leq I_2+I_{REF2}$), the determining unit 352 provides the determining signal $V_S$, indicating that the primary voltage $V_1$ has begun to decrease, to the control circuit 370. Thus, the control circuit 370 turns on the transistor Q1 according to the determining signal $V_S$, as shown in FIG. 5. Furthermore, the control circuit 370 controls the transistor Q1 to turn off when the detection signal $V_D$ indicates that the current $I_S$ is larger than the first reference current $I_{REF1}$. Therefore, the control circuit 370 switches the transistor Q1 continuously according to the determining signal $V_S$ and the detection signal $V_D$ until the flash capacitor 330 is charged to the predetermined voltage $V_{max}$.

Figure 6B:
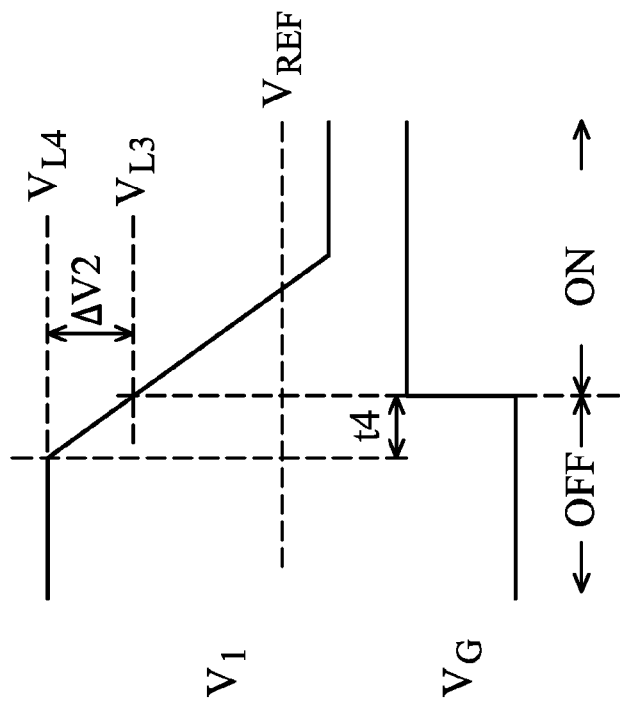
FIGS. 6A and 6B show the waveform diagrams illustrating a primary voltage and a switch state of the transistor according to another embodiment of the invention.
Figure 6A:
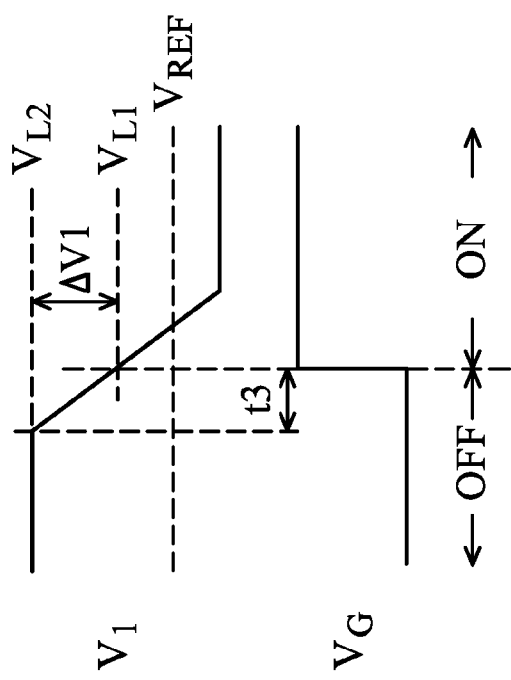

In one embodiment, the determining unit 352 may also provides the determining signal $V_S$ to the control circuit 370 according to a current difference $\Delta I$ between the first current $I_1$ and the sum of the second reference current $I_{REF2}$ and the second current $I_2$ (i.e. $\Delta I=I_1-(I_2+I_{REF2})$). For example, when the current difference $\Delta I$ is smaller than or equal to a specific current value $I_D$, the determining unit 352 provides the determining signal $V_S$ to the control circuit 370 to turn on the transistor Q1. Referring to FIG. 6A and FIG. 6B, FIGS. 6A and 6B show the waveform diagrams illustrating the primary voltage $V_1$ and the switch state of the transistor Q1 according to the embodiment of the invention, wherein FIG. 6A and FIG. 6B separately show operation of the transistor Q1 at the $n^{th}$ switch state and the $m^{th}$ switch state (m>n). In FIG. 6A, the transistor Q1 is turned on when the primary voltage $V_1$ decreases from a voltage level $V_{L2}$ to a voltage level $V_{L1}$, and a voltage difference $\Delta V1$ between the voltage level $V_{L1}$ and the voltage level $V_{L2}$ is determined according to the specific current value $I_D$ and the resistor $R_1$ of the determining circuit 350 in FIG. 4, as shown in the following equation (1):

$$V_{L2}-V_{L1}=\Delta V1=I_D \times R_1 \qquad (1).$$

Furthermore, a response time period for the primary voltage $V_1$ decreasing from the voltage level $V_{L2}$ to the voltage level $V_{L1}$ is t3. In FIG. 6B, the transistor Q1 is turned on when the primary voltage $V_1$ decreases from a voltage level $V_{L4}$ to a voltage level $V_{L3}$. A voltage difference $\Delta V2$ between the voltage level $V_{L3}$ and the voltage level $V_{L4}$ is also determined according to the specific current value $I_D$ and the resistor $R_1$ of the determining circuit 350 in FIG. 4, as shown in the following equation (2):

$$V_{L4} - V_{L3} = \Delta V2 = I_D \times R_1 \tag{2}$$

Therefore, it is to be known that the voltage difference $\Delta V1$ is identical to the voltage difference $\Delta V2$ according to the equations (1) and (2). Moreover, if a falling slope of the primary voltage $V_1$ is fixed, the response time period t4, as shown in FIG. 6B, is equal to the response time period t3, as shown in FIG. 6A. As shown in FIG. 6A and FIG. 6B, the determining circuit 350 provides the determining signal $V_S$ to the control circuit 370 when the primary voltage $V_1$ decreases a specific voltage difference (e.g. $\Delta V1$ of FIG. 6A or $\Delta V2$ of FIG. 6B), so as to turn on the transistor Q1.

In the embodiments of the invention, the primary voltage $V_1$ is compared with a variable voltage level (e.g. the voltage level $V_{L1}$ of FIG. 6A or the voltage level $V_{L3}$ of FIG. 6B), but not the reference voltage $V_{REF}$ with a fixed voltage level. Thus, increasing the speed of the charging time for the flash capacitor 330 and eliminating unnecessary power consumption.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A charging device for providing an output voltage to charge a flash capacitor, comprising:
    a transformer, comprising a primary winding and a secondary winding, wherein the transformer generates a primary voltage at the primary winding according to an input voltage and generates a secondary voltage at the secondary winding according to the primary voltage;
    a diode coupled between the secondary winding of the transformer and the flash capacitor, providing the output voltage according to the secondary voltage;
    a current detector, detecting a current flowing through the primary winding of the transformer to generate a detection signal; a switch coupled between the primary winding of the transformer and a ground;
    a determining circuit, generating a determining signal according to the primary voltage, the secondary voltage and a reference voltage; and
    a control circuit, switching the switch according to the detection signal and the determining signal, so as to control the transformer to charge the flash capacitor.

2. The charging device as claimed in claim 1, wherein the transformer generates the primary voltage according to the input voltage when the switch is turned on, and the transformer provides the secondary voltage to the diode according to the primary voltage when the switch is turned off, so as to generate the output voltage to charge the flash capacitor.

3. The charging device as claimed in claim 2, wherein the control circuit controls the switch to turn off when the detection signal indicates that the current flowing through the primary winding of the transformer is larger than or equal to a specific current.

4. The charging device as claimed in claim 2, wherein the control circuit controls the switch to turn on when the determining signal indicates that the primary voltage has begun to decrease.

5. The charging device as claimed in claim 1, wherein the determining circuit further comprises:
    a reference resistor, generating a reference current according to the reference voltage;
    a first resistor, generating a first current according to the primary voltage; a second resistor, generating a second current according to the secondary voltage; and
    a determining unit, generating the determining signal according to the first current, the second current and the reference current.

6. The charging device as claimed in claim 5, wherein the determining unit provides the determining signal to the control circuit to turn on the switch when the first current is smaller than or equal to the sum of the reference current and the second current.

7. The charging device as claimed in claim 5, wherein the determining unit provides the determining signal to the control circuit to turn on the switch when a difference between the first current and the sum of the reference current and the second current is smaller than or equal to a specific current value.

8. The charging device as claimed in claim 1, wherein an anode of the diode is coupled to the secondary winding of the transformer, and a cathode of the diode is coupled to the flash capacitor.

9. The charging device as claimed in claim 8, wherein the diode further prevents an inverse current from the flash capacitor back to the transformer.

10. A charging device for providing an output voltage to charge a flash capacitor, comprising:
    a transformer, comprising a primary winding and a secondary winding, wherein the transformer generates a primary voltage at the primary winding according to an input voltage and generates a secondary voltage at the secondary winding according to the primary voltage;
    a diode coupled between the secondary winding of the transformer and the flash capacitor, providing the output voltage according to the secondary voltage;
    a switch coupled between the primary winding of the transformer and a ground;
    a determining circuit coupled to the primary winding, comparing the primary voltage with a variable voltage level to generate a determining signal; and
    a control circuit coupled to the determining circuit and the switch, controlling the switch to turn on or off according to the determining signal,
    wherein the determining circuit further comprises:
    a reference resistor, generating a reference current according to a reference voltage;
    a first resistor, generating a first current according to the primary voltage;
    a second resistor, generating a second current according to the secondary voltage; and
    a determining unit, generating the determining signal according to the first current, the second current and the reference current.

11. The charging device as claimed in claim 10, further comprising:
    a current detector, detecting a current flowing through the primary winding of the transformer, and generating a detection signal to the control circuit to turn off the switch when the current flowing through the primary winding of the transformer is larger than or equal to a specific current.

12. The charging device as claimed in claim 10, wherein the control circuit controls the switch to turn on when the determining signal indicates that the primary voltage has begun to decrease.

13. The charging device as claimed in claim 10, wherein the determining unit provides the determining signal to the control circuit to turn on the switch when the first current is smaller than or equal to the sum of the reference current and the second current.

14. The charging device as claimed in claim 10, wherein the determining unit provides the determining signal to the control circuit to turn on the switch when a difference between the first current and the sum of the reference current and the second current is smaller than or equal to a specific current value.

15. The charging device as claimed in claim 10, wherein an anode of the diode is coupled to the secondary winding of the transformer, and a cathode of the diode is coupled to the flash capacitor.

16. The charging device as claimed in claim 15, wherein the diode further prevents an inverse current from the flash capacitor back to the transformer.

17. The charging device as claimed in claim 10, wherein the variable voltage level is determined according to the secondary voltage and a reference voltage.

* * * * *